United States Patent [19]
Houtz et al.

[11] Patent Number: 5,791,316
[45] Date of Patent: Aug. 11, 1998

[54] APPARATUS FOR CONTROLLING FUEL DELIVERY OF AN ENGINE

[75] Inventors: Phillip J. Houtz; Brian R. Weller, both of Lafayette, Ind.

[73] Assignee: Caterpillar Inc., Peoria, Ill.

[21] Appl. No.: 905,671

[22] Filed: Aug. 4, 1997

Related U.S. Application Data

[60] Continuation of Ser. No. 811,911, Mar. 5, 1997, abandoned, which is a division of Ser. No. 414,845, Mar. 31, 1995, abandoned.

[51] Int. Cl.$^6$ .................. F02D 23/02; F02D 31/00; F02D 41/40; F01P 1/06
[52] U.S. Cl. .............. 123/491; 123/357; 123/41.31; 123/563
[58] Field of Search ............. 123/41.29, 41.31, 123/352, 357, 542, 563, 491

[56] References Cited

U.S. PATENT DOCUMENTS

| | | | |
|---|---|---|---|
| 4,000,725 | 1/1977 | Harris | 123/563 |
| 4,389,994 | 6/1983 | Denz et al. | 123/478 |
| 4,419,974 | 12/1983 | Nagase et al. | 123/418 |
| 4,424,783 | 1/1984 | Kotwicki | 123/418 |
| 4,513,695 | 4/1985 | Patchen, II | 123/563 |
| 4,546,742 | 10/1985 | Sturges | 123/41.05 |
| 4,563,983 | 1/1986 | Hayashi et al. | 123/563 |
| 4,697,551 | 10/1987 | Larsen et al. | 123/41.31 |
| 4,714,068 | 12/1987 | Nagase et al. | 123/506 |
| 4,893,589 | 1/1990 | Spinnler | 123/41.31 |
| 4,942,860 | 7/1990 | Chujo et al. | 123/571 |
| 4,961,404 | 10/1990 | Itakura et al. | 123/563 |
| 4,977,743 | 12/1990 | Aihara et al. | 123/41.31 |
| 5,027,771 | 7/1991 | Daikoku et al. | 123/421 |
| 5,027,772 | 7/1991 | Hongo | 123/421 |
| 5,027,779 | 7/1991 | Nishiyama | 123/491 |
| 5,029,565 | 7/1991 | Talbot | 123/425 |
| 5,035,219 | 7/1991 | Ohkumo et al. | 123/425 |
| 5,048,486 | 9/1991 | Okuda et al. | 123/418 |
| 5,050,551 | 9/1991 | Morikawa | 123/305 |
| 5,056,485 | 10/1991 | Kobayashi et al. | 123/414 |
| 5,060,160 | 10/1991 | Binnewies | 364/442 |
| 5,080,067 | 1/1992 | Nakamura | 123/421 |
| 5,113,833 | 5/1992 | Nagano et al. | 123/491 |
| 5,133,303 | 7/1992 | Umehara | 123/41.15 |
| 5,150,300 | 9/1992 | Danno et al. | 364/431.03 |
| 5,153,835 | 10/1992 | Hashimoto et al. | 364/431.11 |
| 5,179,923 | 1/1993 | Tsurutani et al. | 123/435 |
| 5,195,359 | 3/1993 | Kubota et al. | 73/35.04 |
| 5,197,430 | 3/1993 | Hoshiba et al. | 123/421 |
| 5,199,400 | 4/1993 | Sprenger et al. | 123/339.24 |
| 5,201,284 | 4/1993 | Umehara | 123/41.15 |
| 5,201,285 | 4/1993 | McTaggart | 123/41.31 |
| 5,211,011 | 5/1993 | Nishikawa et al. | 60/284 |
| 5,213,082 | 5/1993 | Abe et al. | 123/491 |
| 5,233,959 | 8/1993 | Kojima | 123/406 |
| 5,235,952 | 8/1993 | Takasuka et al. | 123/425 |
| 5,265,693 | 11/1993 | Rees et al. | 180/197 |
| 5,271,367 | 12/1993 | Abe | 123/418 |
| 5,320,077 | 6/1994 | Kamiya et al. | 123/339.11 |
| 5,353,757 | 10/1994 | Susa et al. | 123/41.31 |

*Primary Examiner*—Willis R. Wolfe
*Attorney, Agent, or Firm*—Robert J. Hampsch; Dennis C. Skarvan

[57] ABSTRACT

An apparatus for an internal combustion engine controls engine timing as a function of engine load, speed and air intake temperature to reduce engine NOx emissions and/or engine fuel consumption. The apparatus is particularly beneficial to a large, aftercooled turbocharged engine which utilizes a cooling system having a liquid cooled, separate circuit aftercooler (SCAC) to cool the pressurized intake air. By routing the aftercooler circuit and engine coolant circuit through a common or single core radiator, the aftercooler cooling circuit temperature and associated engine air intake temperature are reduced to further reduce engine NOx emissions and/or engine fuel consumption.

20 Claims, 7 Drawing Sheets

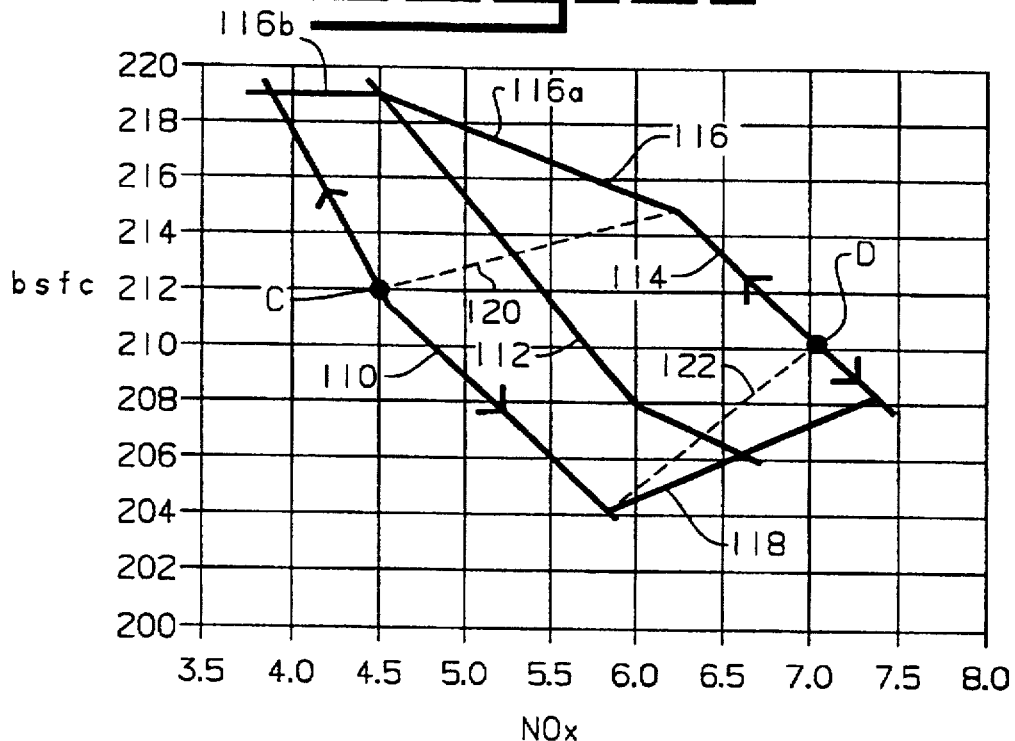
Fig_3_
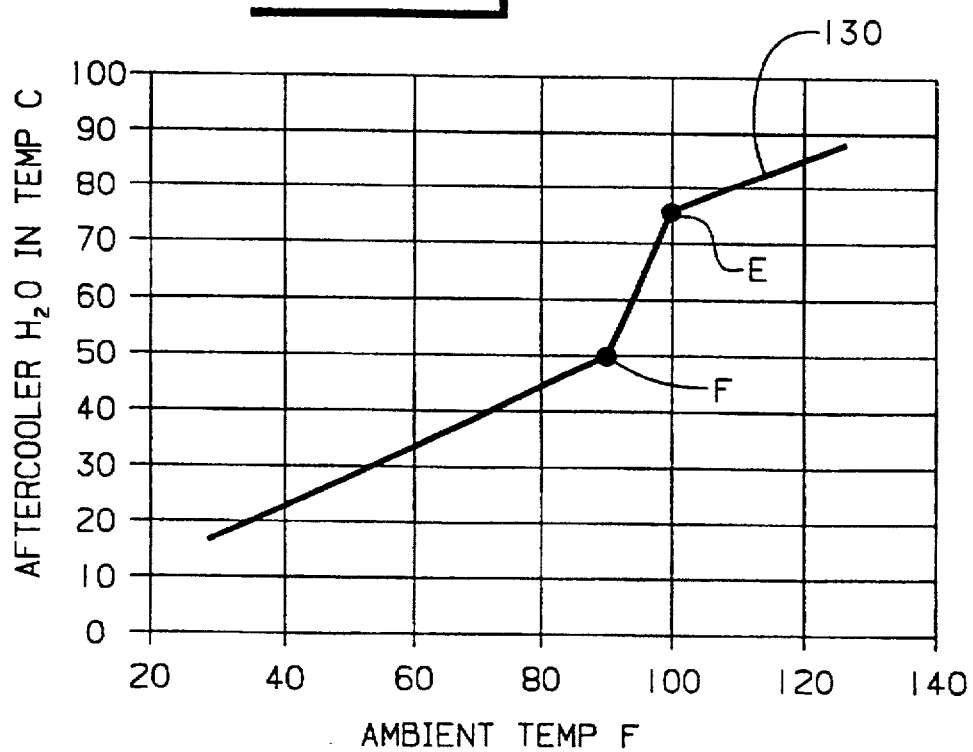
Fig_4_

Fig_5_
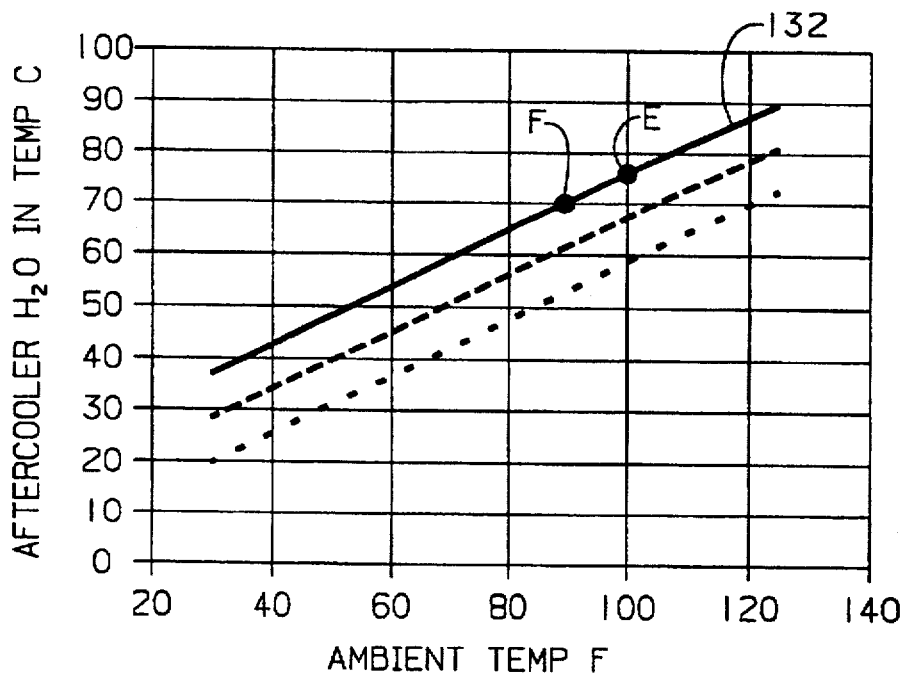
Fig_6_
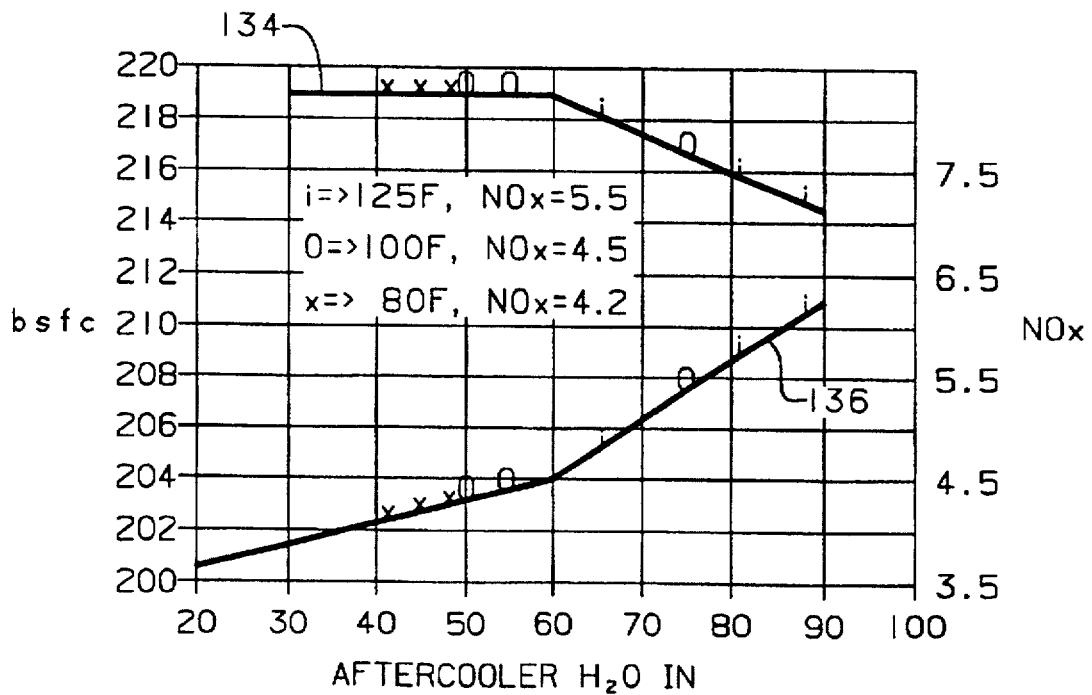

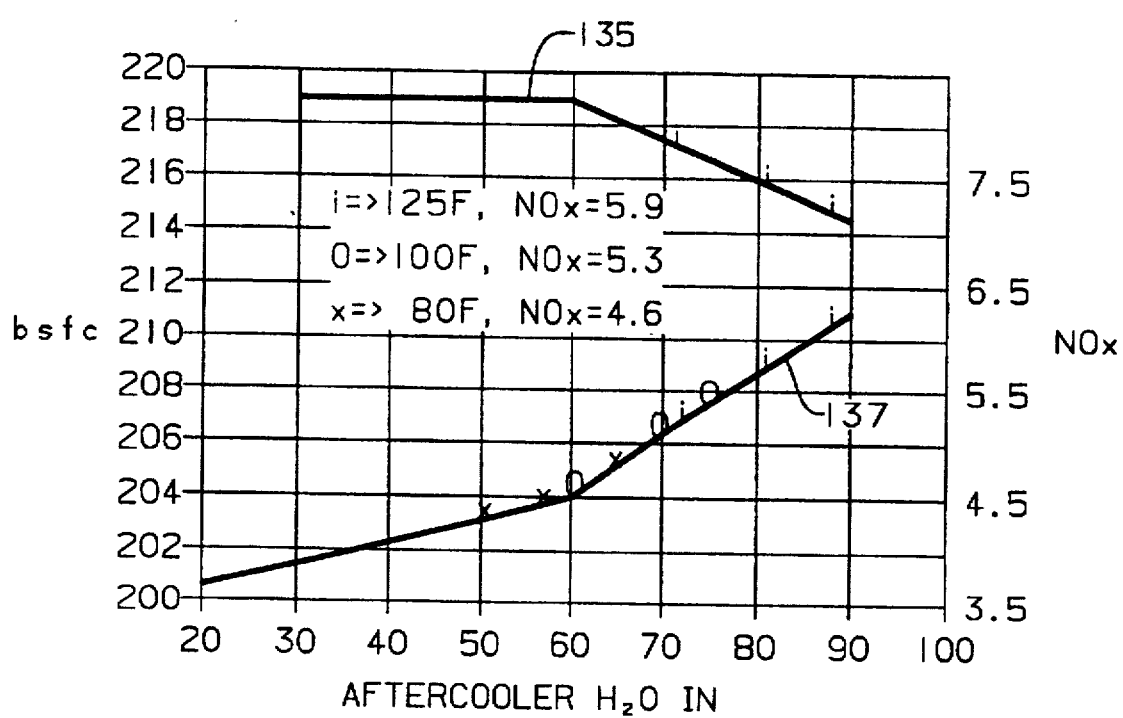

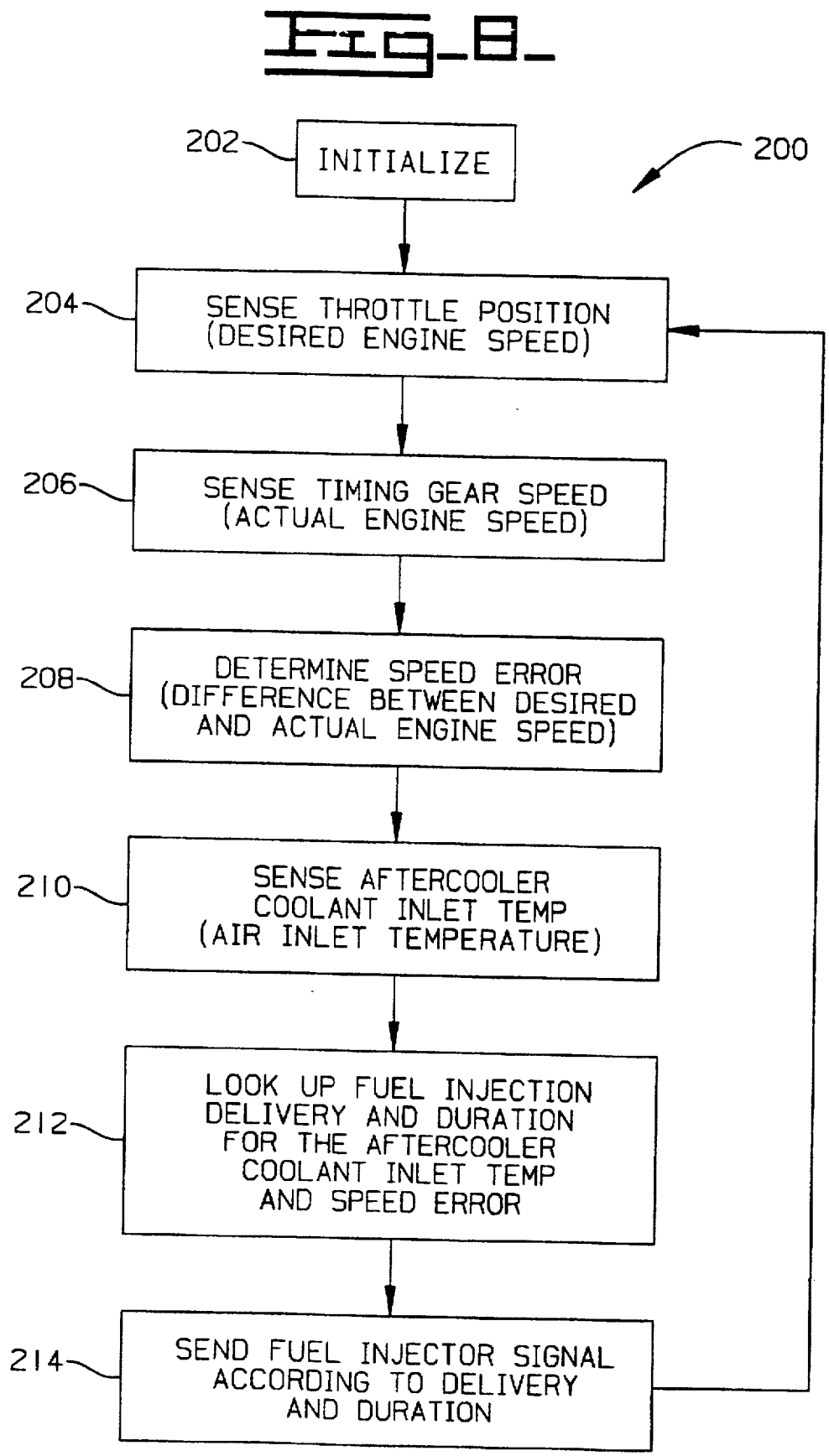

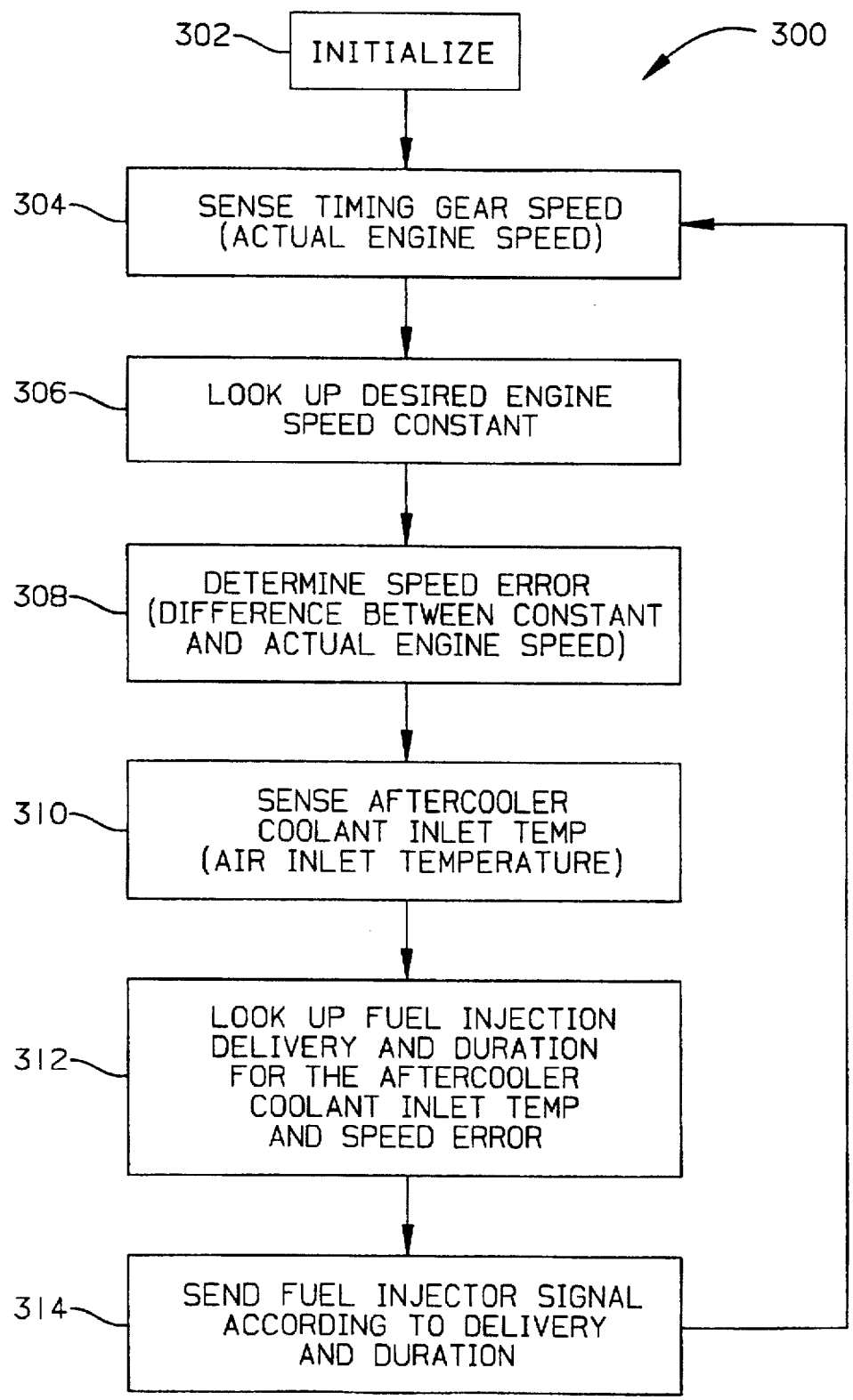

1

APPARATUS FOR CONTROLLING FUEL DELIVERY OF AN ENGINE

This is a continuation application of application Ser. No. 08/811,911, filed Mar. 5, 1997, now abandoned, which is a divisional application of application Ser. No. 08/414,845, filed Mar. 31, 1995, now abandoned.

TECHNICAL FIELD

The present invention relates generally to engine timing strategies and, more particularly, to an engine timing strategy for use with an internal combustion engine having an aftercooler and associated cooling circuit.

BACKGROUND ART

Engine timing strategies are generally known for controlling engine timing to obtain desirable engine operational characteristics. For example, it is known to retard engine timing to provide torque management in a traction control system or to retard engine timing to prevent engine detonation or knock. See U.S. Pat. Nos. 5,265,693 and 5,235,952, respectively. Similarly, it is known to retard engine timing in response to engine temperature to prevent overheating of the engine or to advance engine timing to improve startability of an engine during cold starts. See U.S. Pat. Nos. 5,201,284 and 5,048,486, respectively. Another engine timing strategy is known for controlling engine timing as a function of engine rotational speed and throttle opening degree for engine cold and warm-up states. See U.S. Pat. No. 5,027,771.

While the above engine timing strategies permit desirable engine operation for the described operating parameters, specifically torque management in a traction control system, reduction of engine knock and prevention of overheating and improved starting, they do not address the need for continuously controlling engine timing as a function of engine speed and intake air temperature to reduce engine emissions or to reduce fuel consumption.

For example, engine brake specific fuel consumption and engine NOx emissions generally decrease with decreasing intake air temperatures. However, a typical engine timing strategy varies engine timing as a function of engine speed irrespective of the engine intake air temperature. As a result, the lower NOx emissions and reduced fuel consumption available at the cooler intake air conditions cannot be obtained with present timing strategies.

Additionally, exhaust temperatures and turbocharger speeds increase with increasing ambient air temperatures and intake air temperatures. Therefore, a need exists for controlling engine timing as a function of engine intake air temperature to maintain exhaust temperatures and turbocharger speeds within acceptable limits.

Conversely, peak cylinder pressures increase with decreasing ambient air temperatures and intake air temperatures. Therefore, a need exists for controlling engine timing as a function of engine ambient or intake air temperature to maintain peak cylinder pressures within acceptable limits.

DISCLOSURE OF THE INVENTION

According to one embodiment of the present invention, an apparatus for controlling timing of an internal combustion engine is disclosed, comprising means for sensing engine air inlet temperature and producing an air inlet temperature signal corresponding to the engine air inlet temperature, means for sensing engine speed and producing an engine speed signal corresponding to the engine speed; and means for controlling engine timing in response to the air inlet temperature signal and the engine speed signal.

According to another embodiment of the present invention, a cooling system for an internal combustion engine is disclosed, the engine including a boost device supplying pressurized intake air for combustion, the cooling system comprising a first heat exchanger for cooling engine coolant, a first cooling circuit including a second heat exchanger and a first pump, the second heat exchanger cooling the pressurized intake air and the first pump circulating engine coolant through the first heat exchanger and the second heat exchanger, a second cooling circuit including a second pump and a bypass valve, the second pump and the bypass valve circulating engine coolant through the engine below a predetermined temperature and circulating engine coolant through the engine and the first heat exchanger above the predetermined temperature, a temperature sensor, the temperature sensor sensing engine coolant temperature in the first cooling circuit upstream of the second heat exchanger and producing an engine coolant temperature signal, a speed sensor, the speed sensor sensing engine speed and producing an engine speed signal corresponding to the engine speed, and a controller, the controller controlling engine timing in response to the engine coolant temperature signal and the engine speed signal.

According to yet another embodiment of the present invention, a cooling system for an internal combustion engine is disclosed, the engine including a boost device supplying pressurized intake air for combustion, the cooling system comprising a first heat exchanger for cooling liquid coolant heated by a first source, a first cooling circuit including a second heat exchanger for cooling liquid coolant heated by a second source and a first pump for circulating engine coolant through the first heat exchanger and the second heat exchanger, a second cooling circuit including a second pump and a bypass valve, the second pump and the bypass valve circulating engine coolant through the engine below a predetermined temperature and circulating engine coolant through the engine and the first heat exchanger above the predetermined temperature.

According to still yet another embodiment of the present invention, an apparatus for controlling timing of an internal combustion engine is disclosed, the engine including a heat exchanger adapted for flowing coolant therethrough to cool inlet air to the engine, the coolant having a temperature corresponding to that of the inlet air, the apparatus comprising means for sensing coolant temperature of the heat exchanger and producing a coolant temperature signal corresponding to the engine air inlet temperature, means for sensing engine speed and producing an engine speed signal corresponding to the engine speed, and means for controlling engine timing in response to the coolant temperature signal and the engine speed signal.

BRIEF DESCRIPTION OF THE DRAWINGS

FIG. 3 is a graph of brake specific fuel consumption (BSFC—g/kw-hr) versus NOx emission (g/hp-hr) for an engine utilizing the engine cooling system of FIG. 1 and the engine timing map of FIG. 2.

FIG. 4 is a graph of low side aftercooler coolant temperature (°C.) versus ambient temperature (°F.) for an engine utilizing the engine cooling system of FIG. 1 with a single core radiator and the engine timing map of FIG. 2.

FIG. 5 is a graph of low side aftercooler coolant temperature (°C.) versus ambient temperature (°F.) for an engine utilizing the engine cooling system of FIG. 1 with a split core radiator and the engine timing map of FIG. 2.

FIG. 6 is a graph of brake specific fuel consumption (BSFC—g/kw-hr) versus low side aftercooler coolant temperature (°C.) for an engine utilizing the engine cooling system of FIG. 1 with a single core radiator and the engine timing map of FIG. 2.

FIG. 7 is a graph of brake specific fuel consumption (BSFC—g/kw-hr) versus low side aftercooler coolant temperature (°C.) for an engine utilizing the engine cooling system of FIG. 1 with a split core radiator and the engine timing map of FIG. 2.

FIG. 8 is a microprocessor subroutine for controlling timing of an internal combustion engine in a variable speed application according to one embodiment of the present invention.

FIG. 9 is a microprocessor subroutine for controlling timing of an internal combustion engine in a constant speed application according to another embodiment of the present invention.

BEST MODE FOR CARRYING OUT THE INVENTION

Figure 1:
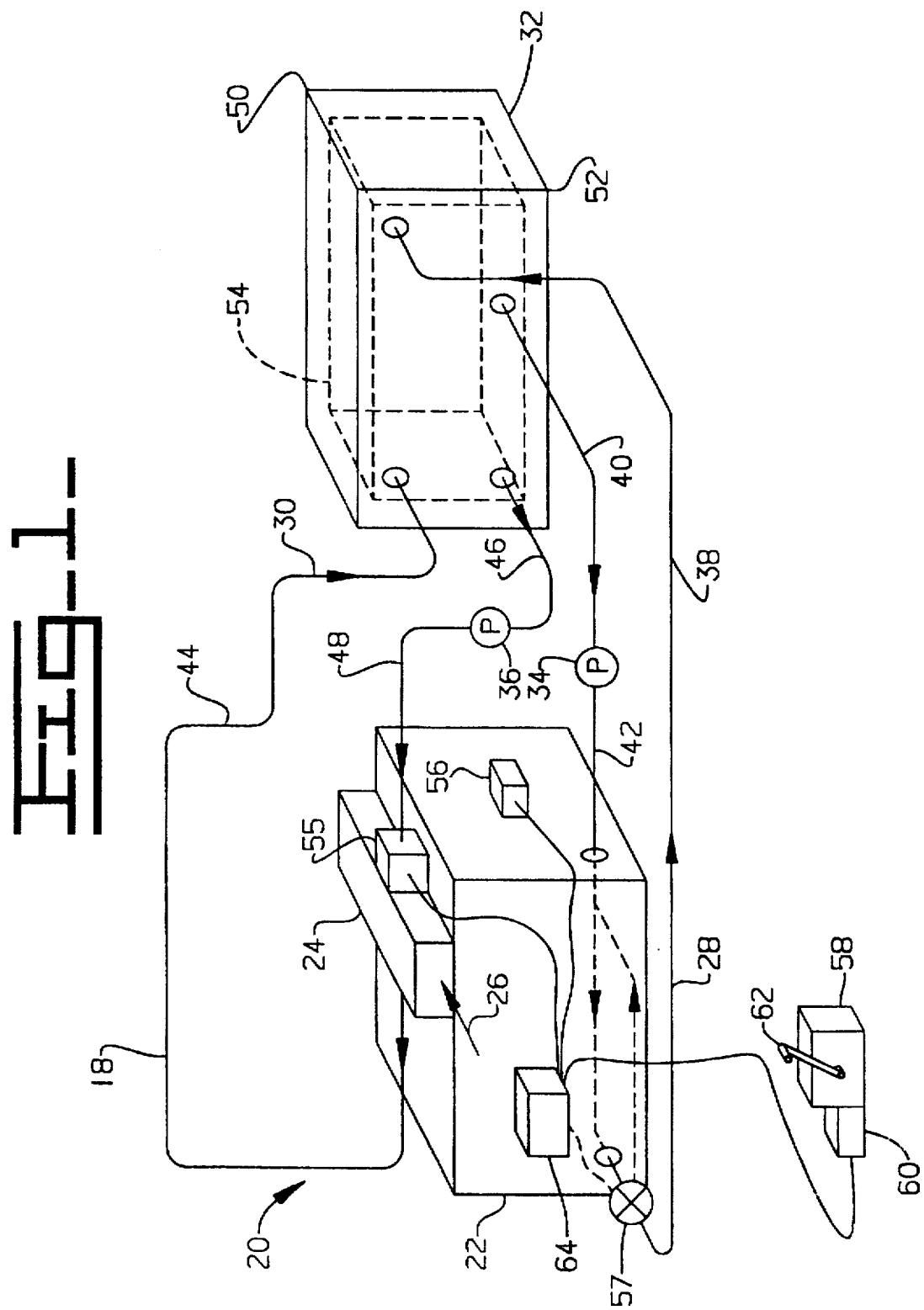
FIG. 1 is a schematic of an engine cooling system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a typical engine cooling system schematic 20 is shown for a large, aftercooled turbocharged engine. Unlike medium duty engines that rely on air-to-air aftercoolers to cool the charged or pressurized air from the turbocharger or turbochargers, cooling system 20 relies on a liquid cooled, separate circuit aftercooler (SCAC) to cool the turbocharged intake air.

In particular, schematic 20 depicts an engine 22 having an aftercooler 24 mounted to an inlet, such as an intake and distribution manifold, of engine 22. Means for supplying charged or pressurized intake air to aftercooler 24 is indicated at 26 and can include one or more superchargers, turbochargers or some combination thereof. In the preferred embodiment, a pair of turbochargers (not shown) driven by exhaust gasses from engine 22 supply the charged intake air.

Two cooling circuits, 28 and 30, are utilized in cooling system 20 to cool engine 22 and the intake air flowing through aftercooler 24, respectively. Cooling circuit 28 circulates engine coolant between engine 22 and radiator 32 via a first pump 34. Cooling circuit 30 circulates engine coolant between aftercooler 24 and radiator 32 via a second pump 36. Conventional coolant lines 38, 40 and 42 interconnect the various components of cooling circuit 28, while conventional coolant lines 44, 46 and 48 interconnect the various components of cooling circuit 30.

Radiator 32 receives engine coolant from each of the cooling circuits adjacent to its top end 50 and returns engine coolant to each of the respective coolant circuits adjacent to its bottom end 52. Radiator 32 can be either of a split core construction, wherein separate heat exchanger cores maintain the cooling circuits separate from one another, or of a single or common core construction, wherein a single heat exchanger core is utilized and the cooling circuits intermix with one another within radiator 32. In the preferred embodiment, radiator 32 is constructed having a single core 54 and the cooling circuits intermix therein. Such a single core construction has been found to be particularly beneficial in optimizing the radiator design as discussed hereafter in greater detail.

In previous engine timing strategies, engine timing was continuously controlled only as a function of desired engine speed and actual engine speed. It should be understood that desired engine speed is largely related to the fuel demand ("rack") required to accelerate or decelerate the engine from the actual engine speed to the desired engine speed. The relationship between the desired engine speed and the actual engine speed is alternately expressed as engine load. Typically, desired engine speed or fuel demand is sensed as the degree of throttle input position. Similarly, actual engine speed as used herein is largely related to the rotational speed of the crankshaft. The particular point of measurement of the desired engine speed and actual engine speed varies according to the installation and is determined typically by ease of access.

The present invention provides an engine timing strategy which is a function of desired engine speed, actual engine speed and engine air intake temperature. However, because the engine air intake temperature exiting the aftercooler is directly related to the low side aftercooler temperature by known heat transfer characteristics, the low side aftercooler temperature is sensed rather than directly sensing engine air intake temperature. In the specific preferred embodiment, the low side aftercooler temperature is sensed at the aftercooler coolant inlet using a conventional engine coolant temperature sensor 55. Sensor 55 senses the aftercooler coolant inlet temperature and produces an aftercooler coolant inlet temperature signal corresponding to the engine air inlet temperature. As a result, the preferred embodiment eliminates the need for more expensive and less reliable air temperature sensors.

In a variable engine speed embodiment, such as in a vehicle application, actual engine speed is sensed by a conventional speed sensor 56 via a timing gear driven off the engine crankshaft. Sensor 56 senses the timing gear speed and produces a timing gear speed signal corresponding to the actual engine speed. Desired engine speed is sensed at a throttle 58 by a conventional throttle position sensor 60. Sensor 60 senses the position of an operator controlled actuator 62 and produces a throttle position signal corresponding to the desired engine speed. A controller 64 receives the aftercooler coolant inlet temperature signal, the timing gear speed signal and the throttle position signal and controls the timing of engine 22 in response to these signals. In the specific preferred embodiment, engine 22 is a diesel engine having hydraulic/electronic unit injectors and controller 64 is a microprocessor which produces a unit injector signal to control engine timing. In an alternate embodiment, engine 22 is a spark ignited engine and controller 64 is a microprocessor that produces an ignition signal to control engine timing.

In a constant engine speed embodiment, such as in a stationary power generator set, engine speed is sensed by a conventional speed sensor 56 via a timing gear driven off the engine crankshaft. Sensor 56 senses the timing gear speed and produces a timing gear speed signal corresponding to the actual engine speed. In this embodiment, controller 64 receives only the aftercooler coolant inlet temperature signal and the timing gear speed signal and controls the timing of engine 22 in response thereto. In particular, controller 64 compares the timing gear speed signal to a predetermined fixed engine speed corresponding to the required frequency of the electrical power delivery and controls engine timing in response to the aftercooler coolant inlet temperature signal and the difference between the timing gear speed signal and the predetermined fixed engine speed.

Figure 2:
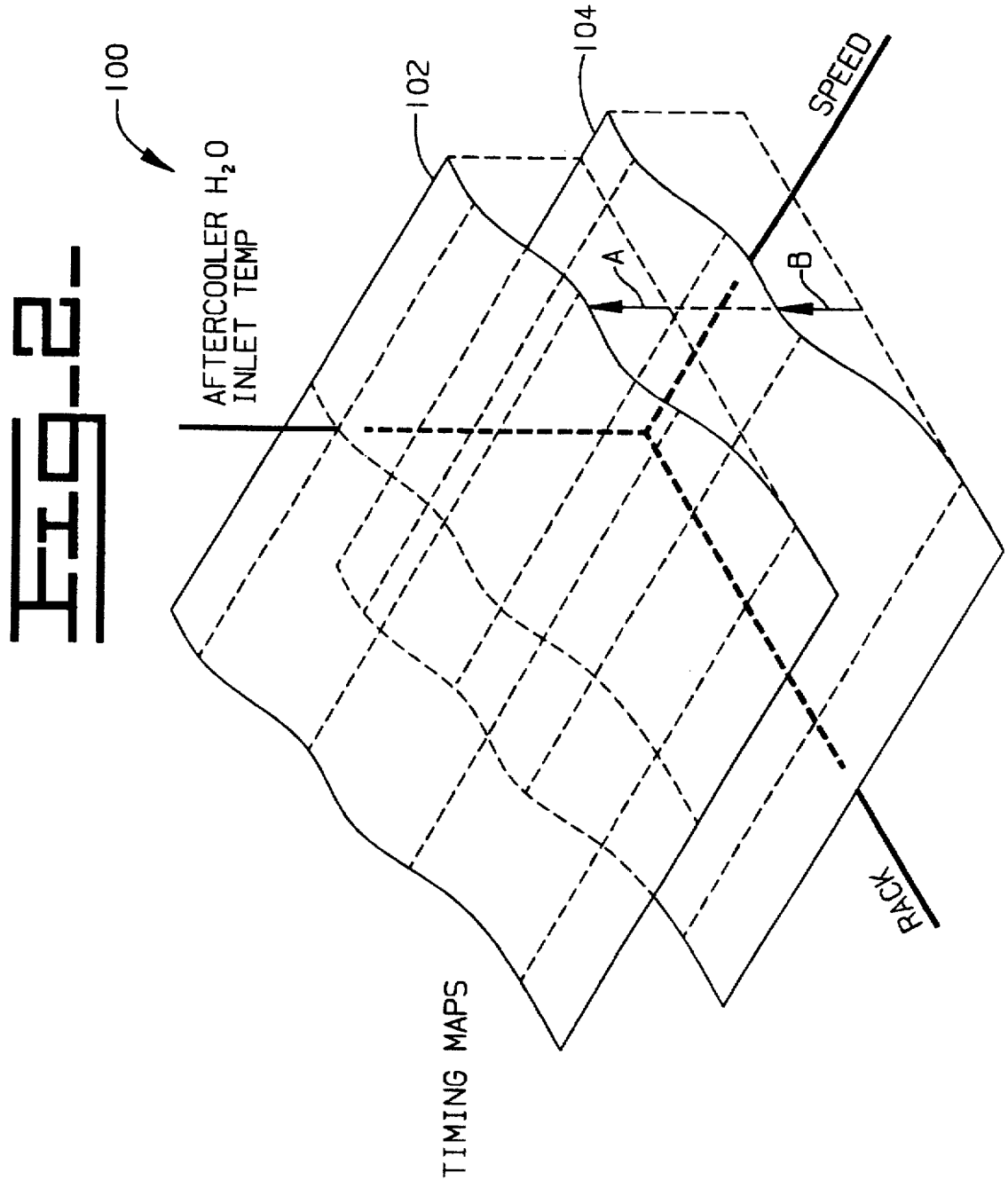
FIG. 2 is a graphical illustration of an engine timing map according to a second embodiment of the present invention.

Referring now to FIG. 2, an engine timing map 100 is shown which depicts generally an engine timing strategy which is a function of desired engine speed (rack), actual engine speed and aftercooler coolant inlet temperature. In map 100, two timing surfaces, 102 and 104, are shown by way of example; however, it is understood that an infinite number of timing surfaces are available according to the present invention. Timing surface 102 represents engine timing as a function of desired engine speed (rack) and actual engine speed for a first aftercooler coolant inlet temperature, while timing surface 104 represents engine timing as a function of desired engine speed (rack) and actual engine speed for a second aftercooler coolant inlet temperature. For example, at a given desired engine speed (rack) and actual engine speed, the desired engine timing varies between a first desired engine timing indicated at 'A' for timing surface 102 and a second desired engine timing indicated at 'B' for timing surface 104.

The capability to vary engine timing as function of aftercooler coolant inlet temperature in addition to engine load and speed permits a wider range of engine operation while still meeting engine temperature and peak cylinder pressure limits. Further, the operating characteristics of the engine can be tailored to the particular installation. For example, minimum levels of NOx can be achieved at the expense of engine BSFC, or alternately, minimum levels of BSFC can be achieved at the expense of NOx emissions.

Referring now to FIG. 3, a performance trade-off graph is shown that is characteristic of engine 22. The performance trade-off graph compares brake specific fuel consumption (BSFC—g/kw-hr) to levels of engine NOx emission (g/hp-hr) for a given engine load and speed. Lines 110, 112 and 114 are constant temperature lines corresponding to 30° C., 60° C. and 90° C. aftercooler coolant inlet temperatures, respectively. Engine timing varies along each of constant temperature lines 110, 112 and 114. In FIG. 3, the three constant temperature lines are shown by way of example; however, it is understood that an infinite number of constant temperature lines are available according to the present invention, for example, by merely interpolating between the three constant temperature lines.

Line 116 is an operating limit line representing engine exhaust temperature/turbocharger speed/maximum allowable BSFC and line 118 is an operating limit line representing peak cylinder pressure limits for the present invention. Depending on the particular installation, the engine timing strategy can be set to achieve minimum NOx emissions (line 116), minimum BSFC (line 118) or a best combination thereof somewhere within the range defined between lines 116 and 118.

Conversely, dashed lines 120 and 122 are operating limit lines representing engine exhaust temperature and peak cylinder pressure limits, respectively, typical of prior art timing strategies that control engine timing only as a function of load and speed. In particular, because in prior art timing strategies engine timing is a function of load and speed alone, line 120 defines a maximum operating limit line set by the exhaust temperature limit (line 116). Without sensing aftercooler coolant inlet temperature, line 120 cannot be set above point 'C' since, in doing so, the engine would operate above the exhaust temperature limit at a 90° C. aftercooler coolant inlet temperature; i.e., the intersection of line 116 and line 114. Similarly, line 122 defines a maximum operating limit line set by the peak cylinder pressure line 118. Without sensing aftercooler coolant inlet temperature, line 122 cannot be set below point 'D' since, in doing so, the engine would operate below the peak cylinder pressure limit at a 30° C. aftercooler coolant inlet temperature; i.e., the intersection of line 118 and 110.

The present invention provides a significant improvement over this and other prior art engine timing strategies. For example, at an aftercooler coolant inlet temperature of 30° C. an engine NOx emission of 3.9 g/hp-hr is achieved (the intersection of lines 116b and 110)—a 13.3% improvement over the prior art NOx emission level of 4.5 g/hp-hr (point 'C'). Similarly, at an aftercooler coolant inlet temperature of 90° C., an engine BSFC of 208 g/kw-hr is achieved (the intersection of lines 116 and 118)—a 1% improvement over the prior art engine BSFC of 210 g/kw-hr (point 'D').

In addition to providing reduced levels of engine emissions and improved fuel consumption, the present invention provides a means for optimizing the engine cooling system. Referring back to FIG. 1, radiator 32 is preferably constructed having a common core for providing cooling of both the engine cooling circuit 28 and the aftercooler cooling circuit 30. A common or single core is preferable over a split core (i.e.; separate aftercooler and engine radiators) in order to take advantage of the built-in overcapacity available in the design of a typical engine cooling system.

For example, engine cooling circuit 28 includes a thermostat and associated valving 57 which, below a predetermined engine coolant temperature, bypasses radiator 32 and routs engine coolant only within the engine. In the preferred embodiment, thermostat 57 is a conventional mechanical thermostat having a predetermined set point corresponding to the mechanical characteristics of the thermostat. Alternately, thermostat 57 is contemplated as including a coolant temperature sensor and associated valving controlled by the engine controller 64 (as indicated by the dashed line) in order to vary the set point temperature). Under normal operating conditions, thermostat 57 routs only to radiator 32 the portion of the engine coolant necessary to maintain the predetermined engine coolant temperature. It is only at worst case hot day and high load engine conditions that thermostat 57 routs substantially all of the engine coolant to the radiator 32. As a result, under normal operating conditions, the engine coolant system is typically under-utilized (i.e., oversized).

Referring now to FIG. 4, and FIG. 5, a line 130 of aftercooler coolant inlet temperature (°C.) versus ambient air temperature (°F.) is shown for a single core radiator having a cross-section of approximately 85 square feet. Above an ambient air temperature of 100° F. indicated at point 'E', the aftercooler coolant inlet temperature is the same as that of a split core radiator system (see line 132 of FIG. 5). At these high ambient temperatures (100° F. and greater), the engine coolant system is substantially fully utilized; that is, the thermostat is routing substantially all of the engine coolant through radiator 32.

Between point 'F' and point 'E', corresponding to between 90° F. and 100° F., the engine coolant system is partially utilized; and because the thermostat 56 is routing only a portion of the engine coolant through radiator 32, there is extra cooling capacity available in the single core radiator to lower the aftercooler coolant inlet temperature below that of a comparably sized split core radiator. For example, at 90° F. the aftercooler coolant inlet temperature for a single core radiator is 50° C., while the aftercooler coolant inlet temperature for a split core radiator is 70° C.

Below point 'F', corresponding to below 90° F. ambient air temperature, the engine coolant system is minimally utilized, and because the thermostat is routing little to none of the engine coolant through radiator 32, there is extra cooling capacity available in the single core radiator to further lower the aftercooler coolant inlet temperature below that of a comparably sized split core radiator. For example, at 40° F. the aftercooler coolant inlet temperature for a single core radiator is 22° C., while the aftercooler coolant inlet temperature for a split core radiator is 42° C.

As a result, the combination of a single or common core radiator with an aftercooled boosted engine that utilizes an aftercooler circuit separate from the engine cooling circuit and that controls engine timing as function of aftercooler coolant inlet temperature in addition to desired engine speed (load) and actual engine speed, permits reductions in aftercooler coolant inlet temperatures and associated reductions in levels of NOx emissions.

For example, referring to FIGS. 6 and 7, lines of engine BSFC (lines 134 and 135) and NOx emissions (lines 136 and 137) are plotted as a function of ambient air temperature for a single core and a split core cooling system, respectively, for an engine timing strategy set up to achieve minimum levels of NOx emissions. Referring to FIG. 6, for a single core radiator system on a 90° F. ambient day, corresponding to an aftercooler coolant inlet temperature of 50° C., cycle NOx emission under a partial load are 4.3 g/hp-hr. Referring to FIG. 7, for a split core radiator system on a 90° F., corresponding to a aftercooler coolant inlet temperature of 70° C., cycle NOx emissions under a partial load are 5.1 g/hp-hr. Therefore, in the specific preferred embodiment described above operating at a 90° F. ambient day, the single or common core radiator cooling system provides a 16% improvement over a split core radiator cooling system when used with an engine that controls timing as function of aftercooler coolant inlet temperature in addition to desired engine speed (load) and actual engine speed.

Alternately, the combination of a single or common core radiator with an aftercooled boosted engine that utilizes an aftercooler circuit separate from the engine cooling circuit and that controls engine timing as function of aftercooler coolant inlet temperature in addition to desired engine speed (load) and actual engine speed, permits reductions in aftercooler coolant inlet temperatures and associated reductions in levels of BSFC.

Referring now to FIG. 8, a method in the form of a subroutine 200 is shown for a diesel engine in a vehicular embodiment according to the present invention. Program execution begins at step 202. In step 202, the various sensors and program memory are reset as required. Program execution advances to step 204 to sense throttle position. Sensor 60 produces a throttle position signal corresponding to the desired engine speed. Controller 64 receives the throttle position signal and stores a throttle position value in memory corresponding to the throttle position signal. Program execution advances to step 206 to sense timing gear speed. Sensor 56 produces a timing gear speed signal corresponding to the actual engine speed. Controller 64 receives the timing gear speed signal and stores a timing gear speed value in memory corresponding to the timing gear speed signal. Program execution advances to step 208 to determine a speed error value as a function of the difference between the throttle position value and the timing gear speed value. Program execution advances to step 210 to sense aftercooler coolant inlet temperature. Sensor 55 produces an aftercooler coolant inlet temperature signal corresponding to the engine air inlet temperature. Controller 64 receives the aftercooler coolant inlet temperature signal and stores an aftercooler coolant inlet temperature value in memory corresponding to the aftercooler coolant inlet temperature. Program execution advances to step 212 to look up a fuel injection delivery value for beginning injection and a duration value for ending injection. Program execution advances to step 214 to issue a fuel injection signal according to the delivery and duration values and then returns to step 204.

Referring now to FIG. 9, a method in the form of a subroutine 300 is shown for a diesel engine in a constant speed embodiment according to the present invention. Program execution begins at step 302. In step 302, the various sensors and program memory are reset as required. Program execution advances to step 304 to sense timing gear speed. Sensor 56 produces a timing gear speed signal corresponding to the actual engine speed. Controller 64 receives the timing gear speed signal and stores a timing gear speed value in memory corresponding to the timing gear speed signal. Program execution advances to step 306 to look up a constant in memory corresponding to the desired engine speed and, at step 308, a speed error value is determined as a function of the difference between the throttle position value and the constant. Program execution advances to step 310 to sense aftercooler coolant inlet temperature. Sensor 55 produces an aftercooler coolant inlet temperature signal corresponding to the engine air inlet temperature. Controller 64 receives the aftercooler coolant inlet temperature signal and stores an aftercooler coolant inlet temperature value in memory corresponding to the aftercooler coolant inlet temperature. Program execution advances to step 312 to look up a fuel injection delivery value for beginning injection and a duration value for ending injection. Program execution advances to step 314 to issue a fuel injection signal according to the delivery and duration values and then returns to step 304.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. An apparatus for controlling the fuel delivery of an internal combustion engine, the engine including a cooling system adapted for flowing coolant therethrough, the coolant having a temperature related to that of the inlet air, the apparatus comprising:

means for sensing coolant temperature of said cooling system and producing a coolant temperature signal having a predetermined relation to the engine air inlet temperature;

means for sensing engine speed and producing an engine speed signal corresponding to said engine speed; and means for controlling delivery of fuel in response to said coolant temperature signal and said engine speed signal.

2. The apparatus of claim 1 further comprising means for sensing a desired speed input and producing a desired speed signal corresponding to said desired speed input, wherein said means for controlling delivery of fuel controls delivery of fuel in response to said coolant temperature signal, said engine speed signal and said desired speed signal.

3. The apparatus of claim 2, and further comprising means for comparing said engine speed signal to said desired speed signal and means for producing a difference speed signal corresponding to the difference between said engine speed and said desired speed input, wherein said means for controlling delivery of fuel controls delivery of fuel in response to said coolant temperature signal and said difference speed signal.

4. The apparatus of claim 1, wherein said engine is a diesel engine having a fuel injection system and said means for controlling delivery of fuel produces a fuel injection signal in response to said coolant temperature signal and said engine speed signal.

5. The apparatus of claim 4, wherein said fuel injection signal controls the fuel injection timing as a function of coolant temperature and engine speed.

6. The apparatus of claim 4, wherein said fuel injection signal controls the fuel injection duration as a function of coolant temperature and engine speed.

7. The apparatus of claim 4, wherein said fuel injection signal controls the fuel injection volume as a function of coolant temperature and engine speed.

8. The apparatus of claim 1 wherein said cooling system further includes a heat exchanger adapted for flowing said coolant therethrough to cool inlet air to the engine, said means for sensing coolant temperature is a temperature sensor, said temperature sensor sensing coolant temperature upstream of said heat exchanger and producing said coolant temperature signal.

9. The apparatus of claim 1, wherein the engine includes a boost device supplying pressurized intake air for combustion, said cooling system further comprising:

a first heat exchanger for cooling engine coolant;

a first cooling circuit including a second heat exchanger and a first pump, said second heat exchanger cooling the pressurized intake air and said first pump circulating engine coolant through said first heat exchanger and said second heat exchanger; and a second cooling circuit including a second pump and a bypass valve, said second pump and said bypass valve circulating engine coolant through said engine below a predetermined temperature and circulating engine coolant through said engine and said first heat exchanger above said predetermined temperature.

10. The apparatus of claim 9, wherein said first heat exchanger is a radiator that includes a common core in which engine coolant from said first cooling circuit intermixes with engine coolant from said second cooling circuit.

11. The apparatus of claim 9, wherein said means for sensing coolant temperature is a temperature sensor, said temperature sensor sensing engine coolant temperature in said first cooling circuit upstream of said second heat exchanger and producing said coolant temperature signal.

12. The apparatus of claim 11, wherein said second heat exchanger is an aftercooler and said temperature sensor senses coolant temperature at an engine coolant inlet of said aftercooler.

13. An apparatus for controlling fuel delivery in an internal combustion engine, the engine including a cooling system adapted for flowing coolant therethrough, the coolant having a temperature related to a temperature of the inlet air, the apparatus comprising:

a temperature sensor coupled to said cooling system for measuring coolant temperature of said cooling system;

a processor based device for determining air inlet temperature based on said measured coolant temperature;

a speed sensor coupled to the engine for sensing engine speed; and an engine controller coupled to said temperature sensor and said speed sensor, said engine controller responsive to said air intake temperature as determined based on said coolant temperature and said engine speed.

14. The apparatus of claim 13 wherein said processor based device is said engine controller.

15. The apparatus of claim 13, and further comprising a desired speed sensor for sensing the desired speed of the engine, said desired speed sensor operatively coupled to the engine controller such that said engine controller controls fuel delivery in response to coolant temperature, actual engine speed, and desired engine speed.

16. The apparatus of claim 15, and further comprising a means for comparing engine speed to desired engine speed and producing engine speed error corresponding to the difference between actual engine speed and desired engine speed, wherein said engine controller controls fuel delivery in response to coolant temperature and engine speed error.

17. The apparatus of claim 13, wherein said engine is a diesel engine having a fuel injection system and said engine controller produces a fuel delivery signal as a function of coolant temperature and engine speed.

18. The apparatus of claim 17, wherein said fuel delivery signal controls the fuel injection timing as a function of coolant temperature and engine speed.

19. The apparatus of claim 17, wherein said fuel delivery signal controls the fuel injection duration as a function of coolant temperature and engine speed.

20. The apparatus of claim 17, wherein said fuel delivery signal controls the fuel injection volume as a function of coolant temperature and engine speed.

* * * * *